M. H. SPIELMAN.
FLASH LIGHT.
APPLICATION FILED APR. 11, 1916.
1,227,012.
Patented May 22, 1917.
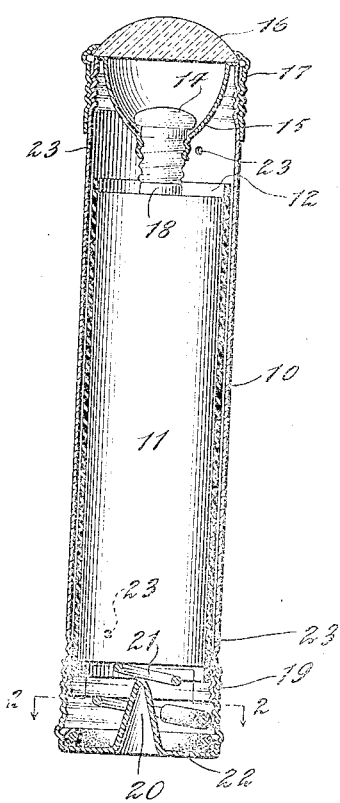
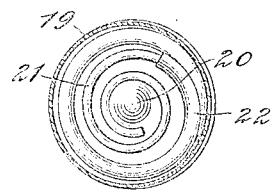
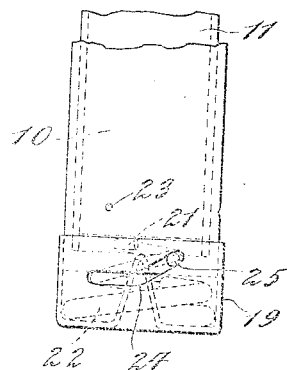
Witnesses:
Inventor
Max H. Spielman
By his Attorney

UNITED STATES PATENT OFFICE.

MAX H. SPIELMAN, OF NEW YORK, N. Y., ASSIGNOR OF ONE-HALF TO JOSEPH CORCOS, OF BROOKLYN, NEW YORK.

FLASH-LIGHT.

1,227,012.  Specification of Letters Patent.  Patented May 22, 1917.

Application filed April 11, 1916. Serial No. 90,356.

*To all whom it may concern:*

Be it known that I, MAX H. SPIELMAN, a citizen of the United States, and a resident of the borough of Manhattan, in the city, county, and State of New York, have invented certain new and useful Improvements in Flash-Lights, of which the following is a description in such full, clear, and exact terms as will enable any person skilled in the art to which it pertains to make and use the same.

The object of my invention is to avoid the usual thumb switch which is placed on the side of the cylindrical battery case or electric torch.

In practice it has been demonstrated that the tendency is to leave this switch on or for it to be accidentally moved so that the circuit is closed and the battery then quickly wears down.

My invention overcomes this by arranging the circuit closing device at one end of the battery case and disposing it so that a turning movement of the end or cap of the case is required by which turning movement the switch is opened or closed. This furnishes a convenient way of lighting the torch and one which will not admit of accidental closing of the circuit.

Reference is had to the accompanying drawings which represent as a sample the preferred embodiments of my invention. In these drawings—

Figure 1 is a sectional view longitudinally of the case.

Fig. 2 is a cross-section on the line 2—2 of Fig. 1, and

Fig. 3 is a partial elevation showing a modification.

10 indicates the cylindrical case which may be of metal. 11 is the battery which is usually furnished with a non-conducting covering of paper or the like 12.

At one end of the case the electric lamp 14 is arranged as usual in a reflector 15, the lens 16 being held by screw cap 17. One terminal of the lamp 14 is in contact with the center pole 18 of the battery 11 and the other is grounded on the reflector 15 and from that to the metallic case 10.

At the bottom end of the case or the end opposite the lamp, the usual screw cap 19 is provided which is removable to admit the introduction of the battery into the case. The current passing along the case 10 to complete the circuit must be brought in connection with the lower end of the battery 11 and according to my invention this is done by projection 20 on the bottom of the cap 19, said projection being preferably stamped or drawn up from the sheet metal of which the cap is formed and so arranged that when the cap 19 is screwed or turned slightly on the body 10 the projection 20 is advanced into contact with the battery wall which being of metal completes the circuit and lights the lamp 14. Preferably a spring 21 is provided to keep the battery from idle movement in the case 10 and also to prevent idle movement of the cap 19. This spring is furnished with an insulation covering 22 or other equivalent means so that the current is not transmitted through the spring from the cap 19 to the metal battery covering 11.

As long as the projection 20 is out of contact with the metal covering of the battery 11, the circuit is open and the lamp 14 is dead. To light the lamp it is only necessary slightly to turn the cap 19 which advances the projection 20 into contact with the battery covering thereby completing the circuit and lighting the lamp. To put out the lamp a cap 19 must be turned back reversely to the first motion. Now it will be observed, that this operation requires a positive movement on the part of the user before the light is put out so that there is no danger of the light being allowed to burn needless except from most wanton carelessness. 23 indicates ventilating openings which are preferably formed in the metal or other exterior case 10.

The construction shown in Fig. 3 amounts simply to the substitution of a bayonet slot 24 and pin 25 for the screw threads on the cap 19 shown in Fig. 1.

Having thus described my invention what I claim as new and desire to secure by Letters Patent of the United States, is:

An electric flash light having a casing, a light and lens rigid at one end thereof, a battery in the casing in permanent contact with the light, a cap movably mounted on the opposite end of the casing and capable of movement in a direction longitudinally thereof, said cap having a part struck inward to form a protuberance capable of contacting with the battery and close the lamp circuit upon said longitudinal movement of the cap on the casing and a spring bearing between the battery and cap to hold the battery permanently in contact with the light.

In testimony whereof I have hereunto signed my name in the presence of two witnesses.

MAX M. SPIELMAN.

Witnesses:

Isaac Brown.